US007895368B2

(12) United States Patent
Yamada

(10) Patent No.: US 7,895,368 B2
(45) Date of Patent: Feb. 22, 2011

(54) WIRELESS COMMUNICATION EQUIPMENT AND CONNECTION PROCESSING METHOD

(75) Inventor: Yoshikazu Yamada, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 191 days.

(21) Appl. No.: 12/411,922

(22) Filed: Mar. 26, 2009

(65) Prior Publication Data

US 2009/0248906 A1 Oct. 1, 2009

(30) Foreign Application Priority Data

Mar. 31, 2008 (JP) ............................. 2008-092259

(51) Int. Cl.
*G06F 3/01* (2006.01)
(52) U.S. Cl. ............................................. 710/9; 710/4
(58) Field of Classification Search ........................ None
See application file for complete search history.

(56) References Cited

U.S. PATENT DOCUMENTS

| 7,058,376 | B2 * | 6/2006 | Logan et al. ............. 455/186.1 |
|---|---|---|---|
| 7,634,670 | B2 * | 12/2009 | Nago et al. .................. 713/300 |
| 7,668,507 | B2 * | 2/2010 | Ramsten et al. ............ 455/41.1 |
| 7,742,742 | B2 * | 6/2010 | Watanabe et al. ........... 455/41.2 |
| 7,747,223 | B2 * | 6/2010 | Wilson et al. ............ 455/67.11 |
| 2003/0210331 | A1 * | 11/2003 | Battles et al. ............. 348/211.2 |
| 2005/0107032 | A1 * | 5/2005 | Homma et al. ............. 455/3.06 |
| 2005/0211780 | A1 * | 9/2005 | Tanaka ................... 235/462.15 |
| 2006/0111097 | A1 * | 5/2006 | Fujii .......................... 455/420 |
| 2006/0230420 | A1 * | 10/2006 | Kawai et al. ................ 725/105 |
| 2006/0258289 | A1 * | 11/2006 | Dua ........................... 455/41.3 |
| 2007/0043844 | A1 * | 2/2007 | Sakai ......................... 709/223 |
| 2007/0120955 | A1 * | 5/2007 | Shimosato ............... 348/14.01 |
| 2007/0149124 | A1 * | 6/2007 | Onozawa .................... 455/41.2 |
| 2007/0223670 | A1 * | 9/2007 | Ido ........................ 379/201.01 |
| 2007/0229670 | A1 * | 10/2007 | Soga ....................... 348/211.2 |
| 2007/0266185 | A1 * | 11/2007 | Goddi et al. .................... 710/8 |
| 2007/0275683 | A1 * | 11/2007 | Songer et al. ............. 455/185.1 |
| 2007/0286144 | A1 * | 12/2007 | Miyake ....................... 370/338 |
| 2007/0293193 | A1 * | 12/2007 | Ramsten et al. ............. 455/411 |
| 2008/0043110 | A1 * | 2/2008 | Aizawa ................... 348/211.2 |
| 2008/0155165 | A1 * | 6/2008 | Mei et al. .................... 710/316 |
| 2008/0201594 | A1 * | 8/2008 | Narushima ................. 713/324 |
| 2009/0080390 | A1 * | 3/2009 | Zhou et al. .................. 370/338 |
| 2009/0113300 | A1 * | 4/2009 | Tuli ............................ 715/716 |
| 2009/0199106 | A1 * | 8/2009 | Jonsson et al. ............. 715/744 |
| 2010/0020186 | A1 * | 1/2010 | Matsui .................... 348/211.2 |
| 2010/0066839 | A1 * | 3/2010 | Azuma et al. ............ 348/207.1 |

\* cited by examiner

*Primary Examiner*—Cheng-Yuan Tseng
(74) *Attorney, Agent, or Firm*—Volpe and Koenig P.C.; Ryan W. O'Donnell

(57) ABSTRACT

Wireless communication equipment which associates with a plurality of sets of peripheral equipment present in a prescribed range through wireless communication stores identification code information regarding the associated peripheral equipment, acquires identification code information from the peripheral equipment present in the prescribed range, and determines whether or not the peripheral equipment has already associated on the basis of the identification code information. If the peripheral equipment has not been associated, the wireless communication equipment stores the identification code information by associating them with an image. If the peripheral equipment has been associated, the wireless communication equipment displays the associated image stored by associating them with the acquired identification code information, and connects to the corresponding peripheral equipment in response to the selection of the displayed and associated image.

6 Claims, 7 Drawing Sheets

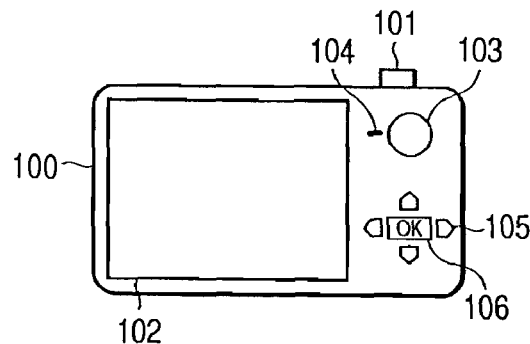
F I G. 1
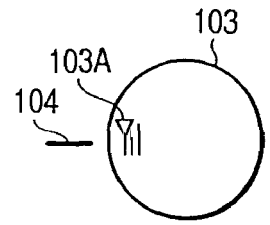
F I G. 2
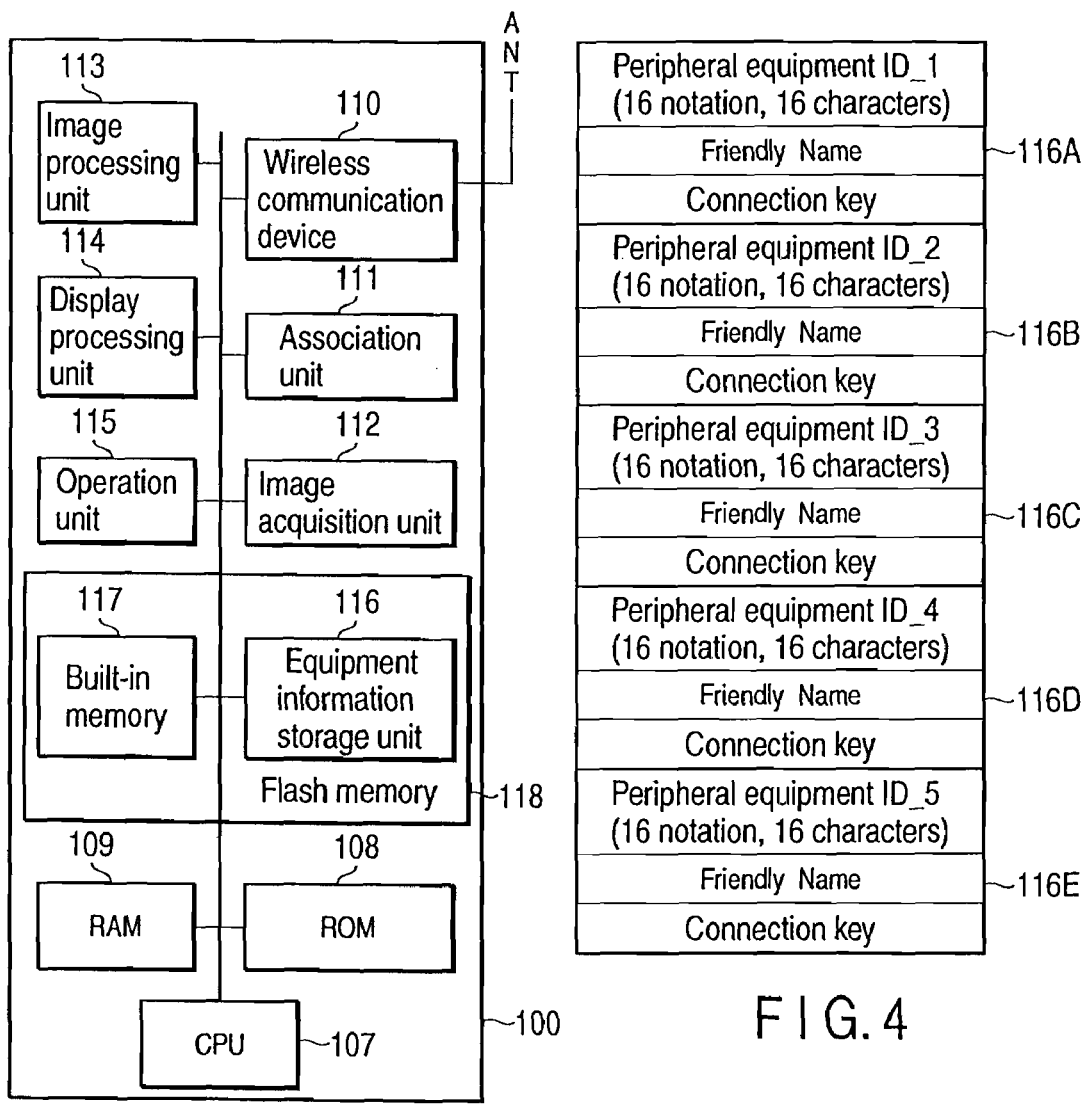
F I G. 3
F I G. 4

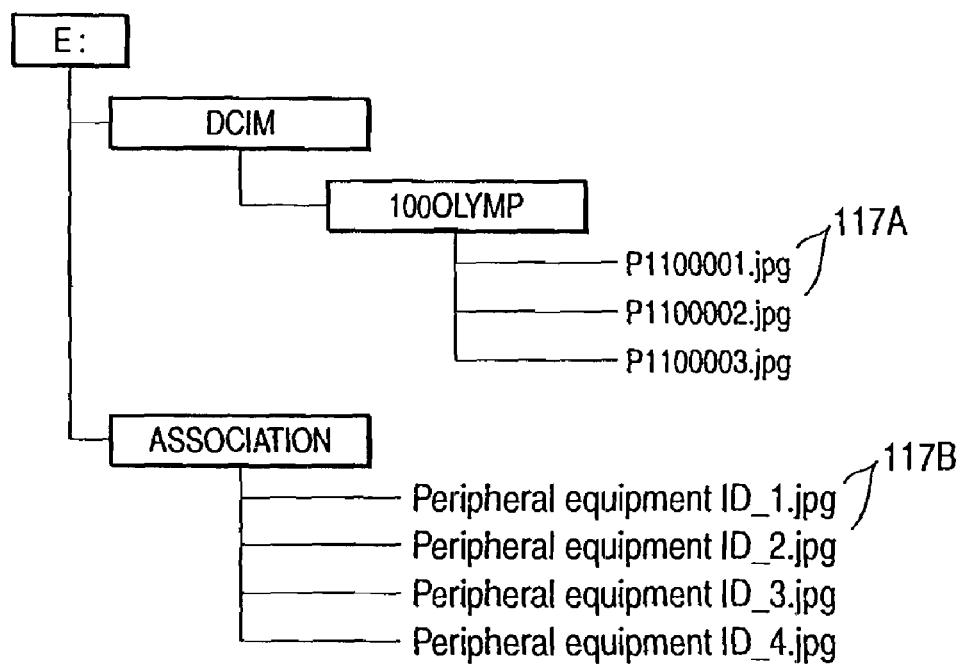
F I G. 5
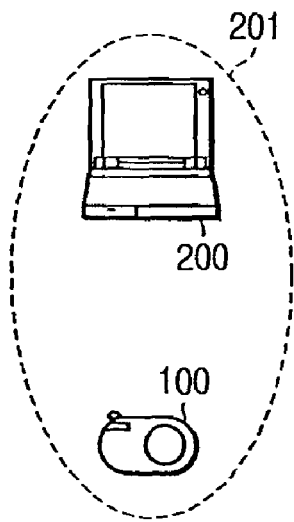
F I G. 6

WIRELESS COMMUNICATION EQUIPMENT AND CONNECTION PROCESSING METHOD

CROSS-REFERENCE TO RELATED APPLICATIONS

This application is based upon and claims the benefit of priority from prior Japanese Patent Application No. 2008-092259, filed Mar. 31, 2008, the entire contents of which are incorporated herein by reference.

BACKGROUND OF THE INVENTION

1. Field of the Invention

The invention relates to wireless communication equipment which performs association with peripheral equipment present in a prescribed range through wireless communication, and relates to a connection processing method which connects such wireless communication equipment and the peripheral equipment to each other.

2. Description of the Related Art

In recent years, connection between a plurality of sets of electronic equipment has evolved from wired communication to wireless communication. As a representative example, wireless USB is known.

In general, when connecting a plurality of sets of wireless communication equipment not mutually having connection information, the plurality of sets of wireless communication equipment perform association, which approves one another and hold a shared key (connection key), to acquire names of plurality of sets of partner's equipment. Once the association is completed, a connection destination is selected based on the information obtained by the association. As regards wireless USB, a numeric system has been defined as one of association methods.

When starting wireless communication, a connection processing method retrieves to display a plurality of sets of equipment present in a wireless connection range and makes a user select a partner's equipment as disclosed, for example, in U.S. Patent Application Publication No. 2005/0107032. Similarly, when connecting the wireless communication equipment to already associated equipment through the wireless communication such as wireless USB, in general, the connection processing method displays the names of the plurality of sets of equipment present in the wireless connection range and makes the user select the partner's equipment.

BRIEF SUMMARY OF THE INVENTION

According to a first aspect of the present invention, there is provided wireless communication equipment which performs association through wireless communication with peripheral equipment present in a prescribed range, comprising:

a storage unit configured to store identification code information which identifies the peripheral equipment as regards already associated peripheral equipment;

an acquisition unit configured to acquire identification code information which identifies the associated peripheral equipment from the peripheral equipment present in the prescribed range;

a determination unit configured to determine whether or not the peripheral equipment has been associated on the basis of identification code information stored in the storage unit;

an association unit configured to associate the identification code information acquired by the acquisition unit with a prescribed image and to store the identification code information and the prescribed image, when it is determined that the peripheral equipment has not been associated by the determination unit;

a display unit configured to display the prescribed image information which is associated with the identification code information acquired by the acquisition unit and is stored in the storage unit, when it is determined that the peripheral equipment has been associated by the determination unit;

a selection unit configured to select image displayed by the display unit; and a connection processing unit configured to perform processing which connects the wireless communication equipment to the peripheral equipment corresponding to the identification code information associated with the image selected by the selection unit.

According to a second aspect of the present invention, there is provided a connection processing method of wireless communication equipment which performs association through wireless communication with peripheral equipment present in a prescribed range, comprising:

acquiring identification code information which specifies the peripheral equipment from the peripheral equipment present in the prescribed range;

displaying the identification code information when there is no image stored by associating with the acquired identification code information;

displaying, when there is the image stored by associating with the acquired identification code information, the associated and stored image;

storing, when the displayed identification code information is selected, the selected identification code information by associating with the prescribed image; and connecting, when the displayed image is selected, the wireless communication equipment to the peripheral equipment corresponding to the identification code information associated with the selected image.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an exemplary view which views a digital camera with a built-in wireless function as wireless communication equipment according to one embodiment of the invention from its rear side;

FIG. 2 is an exemplary view depicting a mode dial in a magnified manner;

FIG. 3 is an exemplary system configuration view of the digital camera;

FIG. 4 is an exemplary view depicting an example of a storage format of an equipment information storage unit;

FIG. 5 is an exemplary view depicting a folder structure of a built-in memory;

FIG. 6 is an exemplary view depicting a wireless connection range of the digital camera and peripheral equipment;

DETAILED DESCRIPTION OF THE INVENTION

Figure 7:
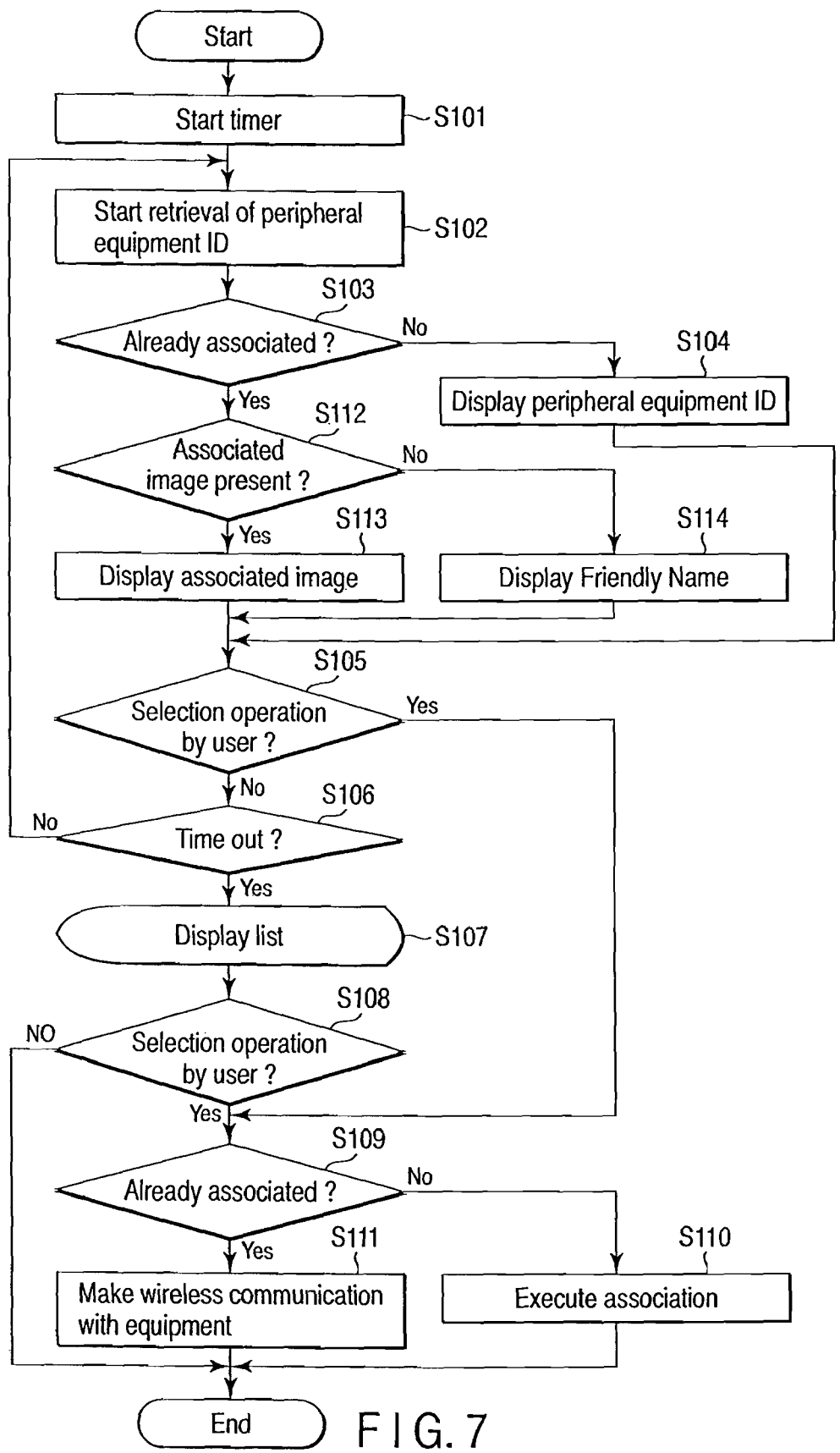
FIG. 7 is an exemplary view depicting a flowchart of a peripheral equipment retrieval sequence.

Hereinafter, the best form so as to implement the invention with reference to the drawings.

As shown in FIG. 1, a main unit of a digital camera 100 having a built-in wireless function as wireless communication equipment according to one embodiment of the invention is provided with a shutter 101, a liquid crystal display 102, a mode dial 103, a mode dial detection position 104, up/down and right/left keys 105, an OK key, etc.

The display 102 is used not only for display a subject during photographing but also displaying a numerical value obtained in a numeric system of association and displaying an image list of a plurality of sets of peripheral equipment present in a connectable range. The mode dial 103 is a dial for setting each mode of the digital camera 100, and the digital camera is set in a mode which has been aligned with the mode dial detection position 104. As shown in FIG. 2, the digital camera 100 is designed so as to start wireless connection when a wireless communication position 103A on the mode dial 103 aligns with the mode dial detection position 104. That is, the mode dial 103 functions as a member for setting the digital camera 100 in a wireless communication mode. The up/down and right/left keys 105 are used for selecting an image of an equipment list, and is configured in order to decide wireless connection to the peripheral equipment corresponding to the selected image through operations of the OK key 106.

As regards a system configuration of the digital camera 100, the digital camera 100 is provided with a CPU 107, a ROM 108, a RAM 109, a wireless communication device 110, an association unit 111, an image acquisition unit 112, an image processing unit 113, a display processing unit 114, an operation unit 115, an equipment information storage unit 116, a built-in memory 117, etc., as shown in FIG. 3.

The CPU 107 is a processor in order to control operations of the digital camera 100. A control program of the CPU 107 is stored in the ROM 108, and the RAM 109 functions as a working area.

The wireless communication device 110 is designed so as to execute wireless communication defined in the Wireless USB standard. The association unit 111 is designed so as to implement association in a numerical system with peripheral equipment which has not been recognized by the digital camera 100. The association unit 111 may be integrated in the ROM 108 as a program, and may be configured so as to function of the association unit 111 owing to the execution of the program by means of the CPU 107. The association means a process in which a plurality of sets of equipment establish initial connection with each other. Under a normal operation situation, the association is performed in one time process, and is needed only at the initial process. In the connection after this, the plurality of sets of equipment are automatically connected to each other on the basis of information stored during association.

The image acquisition unit 112 is an image input unit which photographs a subject through an image sensor (not shown) to input the photographed image. The image processing unit 113 compresses the input image according to the JPEG standard. The display processing unit 114 displays the image on the display 102. The operation unit 115 is designed so as to detect whether or not the shutter 101, mode dial 103, up/down and right/left keys 105 or OK key 106 are operated and report the operations to the CPU 107.

The storage unit 116 is an area in order to store information which is peculiar to the peripheral equipment acquired through the association by means of the association unit 111. The built-in memory 117 is an area which stores normal photographed images and associated images. When the digital camera 100 is connected with a personal computer (PC), the built-in memory 117 may be accessed from the PC as a large-capacity storage device. In general, the storage unit 116 and the built-in memory 117 are assigned to a non-volatile memory which is called a flash memory 118 and which is capable of being deleted and written in blocks.

As shown in FIG. 4, registration areas by five sets of peripheral equipment are prepared from a registration area 116a to a registration area 116E in the storage unit 116. However, the number of registration areas is not limited to five, the number may be variable. The configurations of the registration areas depend on the program, and they are not specified herein. If the number of the registration areas is fixed, to register new equipment in a state in which the registration area is full of the already registered equipment, it is necessary to delete the already registered equipment to replace with the new equipment. The replacement method also depends on a program, and the method is not mentioned here.

A peripheral equipment ID, a Friendly Name and a connection key are registered in each registration area. The peripheral equipment ID is information which is peculiar to equipment and is composed of 16 characters in hexadecimal notation. The Friendly Name is information, for example, a peripheral equipment name, and this information is the identical information if the peripheral equipment has the same type as each other. The connection key is a key shared with the peripheral equipment.

The built-in memory 117 has a folder structure shown in FIG. 5. Here, it is assumed that the built-in memory 117 is configured as an E drive. A DCIM folder and an image storage folder ("100OLYMP" folder in this embodiment) are created in the built-in memory 117 for normally photographed images, and photographed images 117A are stored in the folder. In the embodiment, an associated image storage folder (ASSOCIATION folder in this embodiment) is created, and associated images 117B described below are stored.

Operations of the digital camera 100 of the configuration of the above will be described hereinafter.

As shown in FIG. 6, if the digital camera 100 is present in a wireless connection range 201 that is a range in which peripheral equipment (PC) 200 is wirelessly connectable, when the wireless communication position 103A of the mode dial 103 of the digital camera 100 is aligned with the mode dial detection position 104 as shown in FIG. 2, a peripheral equipment retrieval sequence shown in FIG. 7 is started. Of cause, when moving the digital camera 100 to the wireless connection range 201 of FIG. 6 after setting the mode dial 103 in advance as shown in FIG. 2, the retrieval sequence is started in the same manner.

The CPU 107 of the digital camera 100 executes the peripheral equipment retrieval sequence shown in FIG. 7 in order to connect the digital camera 100 to the peripheral equipment 200 in the wireless connection range 201 in accordance with the control program stored in the ROM 108.

The sequence when the digital camera 100 has not been associated with the peripheral equipment 200 will be firstly described.

When the wireless communication position 103A of the mode dial 103 is aligned with the mode dial detection position 104, the CPU 107 firstly sets a time period which retrieves the peripheral equipment present in the connection range 201 (Step S101). As regards wireless USB, the time period of 30 seconds to two minutes is recommended.

Figure 8A:
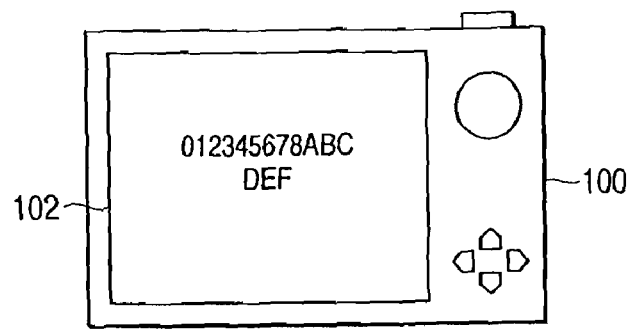
FIG. 8A is an exemplary view depicting a display example when unassociated peripheral equipment is detected.

Then, the wireless communication device 110 obtains a peripheral equipment ID (in other words, referred to as a host ID) from a partner destination through an antenna (ANT) (Step S102). The peripheral equipment ID is included in a packet which is called an MMC in wireless USB. When finding the equipment ID, the wireless communication device 110 reports the equipment ID to the CPU 107. The CPU 107 checks whether or not the detected equipment ID has been already registered in the equipment information storage unit 116 (Step S103). At the beginning, the detected equipment ID has not been registered (has not been associated). Therefore, the sequence proceeds to NO and displays the detected equipment ID on the display 102 by means of the display processing unit 114 (Step S104). This peripheral equipment ID is an ID number which is peculiar to each set of equipment, and a display example is shown in FIG. 8A. If the equipment ID has been associated, the sequence in Step S103 proceeds to YES; this case will be described later.

After displaying the equipment ID in Step S104, the CPU 107 determines whether or not the user performs a selection operation through the operation unit 115 (Step S105). If the user does not perform the selection operation, the CPU 107 further determines whether or not the time period which has been set in Step S101 has passed, namely, whether time-out has occurred or not (Step S106). If the time-out has not occurred, the sequence returns to Step S102.

While the retrieval is implemented until the time-out has occurred, the user may interrupt the retrieve by selecting the peripheral equipment on the way and may connect with the peripheral equipment (YES, Step S105). Thereby, there is no need to wait for the time-out. This sequence will be described later.

If it is determined that the time-out has occurred in Step S106, the CPU 107 displays the list of the detected host IDs on the display 102 by means of the display processing unit 114 (Step S107). In the example of FIG. 6, since the equipment to be detected is one set (peripheral equipment 200), the display is represented as shown in FIG. 8A.

After this, the CPU 107 determines the presence or absence of the selection operation by the user through the operation unit 115 (Step S108). When the user performs the selection operation here or in Step S105, the wireless connection with the selected peripheral equipment 200 is started. Although the selection operation is not defined clearly, the digital camera 100 achieves this selection operation through pressing an arbitrarily assigned button (e.g., OK key 106). When the user performs the selection operation in Step S105 or S108, the CPU 107 determines whether or not the association has been already completed (Step S109). In this embodiment, since the association has not been completed (the peripheral equipment ID has not been registered in the equipment information storage unit 116), the sequence proceeds to NO to execute the association (Step S110). If the association has been completed (the equipment ID has been registered in the storage unit 116), Step S109 proceeds to YES to make wireless communication with the peripheral equipment 200 (Step S111); however, this sequence will be described later.

Figure 9:
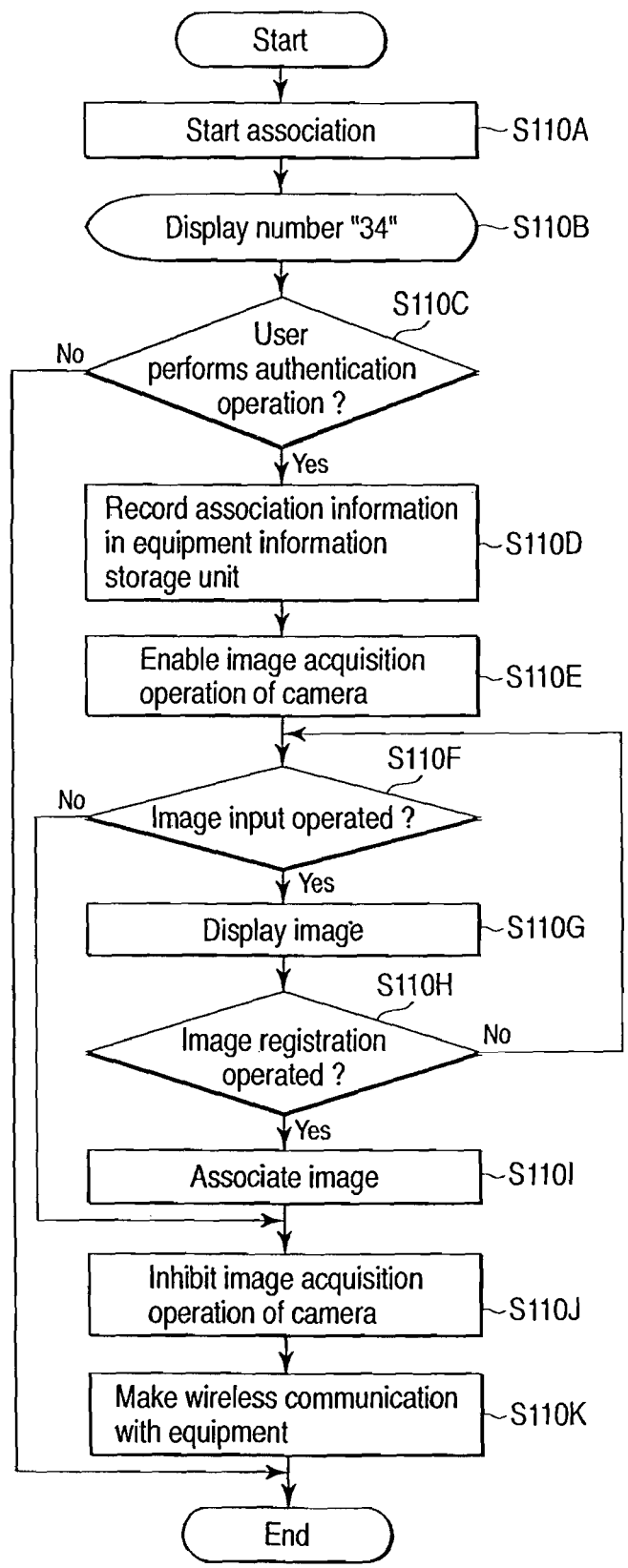
FIG. 9 is an exemplary view depicting an exemplified flowchart of the association.

In Step S100, for example, the association in numerical system for wireless USB shown in FIG. 9 is performed. The association means an authentication procedure which confirms the mutual reliability between the digital camera 100 and the peripheral equipment.

The CPU 107 firstly starts the association in the numerical system (Step S110A). Since the detail of the association in the numerical system is defined in an Association Models Supplement to the Certificated Wireless Serial Bus Specification in the Wireless USB standard, the detail is not described herein. Both the peripheral equipment 200 and the digital camera 100 mutually calculate a numerical value.

Figure 8B:
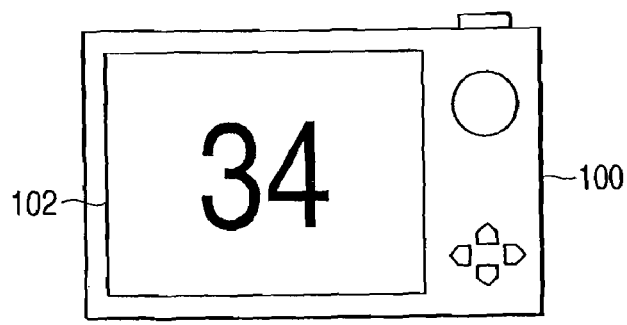
FIG. 8B is an exemplary view depicting an example of a numerical display during association.

The CPU 107 displays calculated numerical values on the liquid crystal display 102 by means of the display processing unit 114 (Step S110B). An example of the display is shown in FIG. 8B. While a numerical value is displayed for the peripheral equipment 200 in the same way; however, the example is not mentioned herein (in wireless USB, it is defined for a host to be displayed with four figures, and for a device to be displayed with two figures). The association prompts the user to authenticate in order to connect equipment mutually (Step S110C). Although the authentication method is not defined clearly, the authentication is achieved by pressing a return key on a keyboard for the PC, and by pressing an arbitrarily assigned button (e.g., OK key 106) for the digital camera 100. Meanwhile, if the user does not perform the authentication operation within a defined time period, the association becomes invalid.

If it is determined that the user has been authenticated in Step S110C, the CPU 107 acquires information (Friendly Name) of the peripheral equipment 200 from the peripheral equipment 200 through the antenna by means of the wireless communication device 110 to store the information in the equipment information storage unit 116 and then completes the association (Step S110D).

After completing the association, the CPU 107 can select the peripheral equipment on the basis of the Friendly Name. However, since a plurality of peripheral sets of equipment in the connectable range are present in the office, etc., it is hard to select equipment as a partner only by the name. There may be a case in which the plurality of sets of peripheral equipment have the same Friendly Name, so that the user has to determine depending on a combination of both the peripheral equipment ID and the Friendly Name.

Figure 8C:
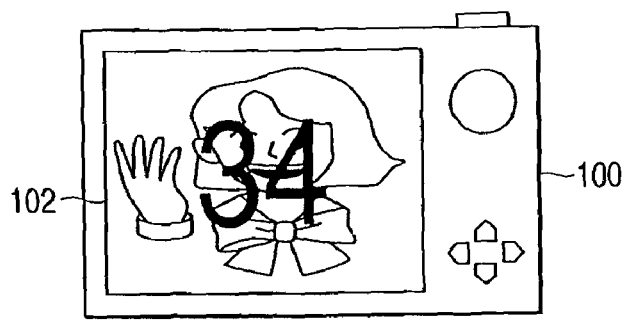
FIG. 8C is an exemplary view depicting a display example of a subject during association.

Thereby, the embodiment intends to display the associated image instead of the Friendly Name to make the user easily recognize the peripheral equipment. Therefore, the CPU 107 firstly switches the digital camera 100 to a photographic mode which enables performing the photographic operation by the image acquisition unit 112 (Step S110E). Thus, photographic preparation for the associated image associating with the peripheral equipment ID is done, and an image captured from the image acquisition unit 112 is displayed on the display 102 as a through image by means of the display processing unit 114. Any subject is accepted, and the user may select the subject arbitrarily. FIG. 8C shows a display example when the user is selected as the subject. Overlapping to display the subject to be displayed as the through image and the calculated numerical value enables reporting that the associated image has been captured. The operation in Step S110E may be performed at the time of the start of the association. However, when performing the calculation of the numerical value of the association through the CPU 107, since it takes a time to calculate the numerical value because the CPU power is required, and meanwhile, because the calculation time is recommended to three seconds or shorter on the association, it is preferable to enable performing the photographic operation after the calculation in this way.

The CPU 107 then determines the presence or absence of the image input operation by means of the operation unit 115 (Step S110F). The image input operation is a procedure for pressing the shutter 101. If the image input operation is not present, the CPU 107 determines that the association between the images is not performed, the sequence proceeds to Step S110J given below. The key for determining the absence of the image input operation is not described herein. Even if the images are not associated with one another here, it is able to assign the associated images later as mentioned below.

Figure 8D:
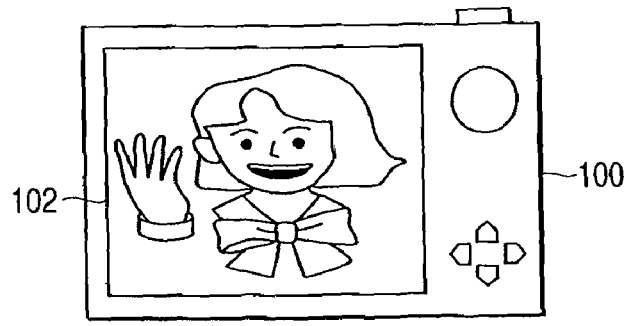
FIG. 8D is an exemplary view depicting a display example of an associated image during association.

If the image input operation is performed in Step S110F, the CPU 107 displays the photographed images on the display 102 through the display processing unit 114 (Step S110G). FIG. 8D shows a display example. In this case, the numerical value is not displayed on the screen. The CPU 107 determines the presence or absence of the image registration operation for registering the displayed image as the associated image (Step S110H). The operation is not defined clearly; however, the digital camera 100 achieves the operation by pressing an arbitrarily assigned button (e.g., OK key 106). If the image registration operation is absence, the sequence returns to Step S110F, and the CPU 107 enables performing the photographic operation again. The key for determining NO of the image registration operation is not described herein.

If it is determined that the image registration operation has been done, the CPU 107 uses the peripheral equipment ID as the retrieval key (file name), and stores the associated images in the built-in memory 117 like the normal photographed image (Step S110I). As shown In FIG. 5, the CPU 107 stores the associated images 117B by using the name of the peripheral equipment ID in an associated image storage folder (ASSOCIATION folder in this embodiment). Separating the associated images 117B from the equipment information storage unit 116 and storing the associated images 117B are implemented so as to reduce the capacity of the equipment information storage unit 116 and also take replacement of the image, deletion of the image and addition of the image later (selection of NO in Step S110F of FIG. 9) into account.

After storing the associated images 117B in this way, or if it is determined that the images are not associated with one another in Step S110F, the CPU 107 prohibits a photographic operation by the image acquisition unit 112 of the digital camera 100 (Step S110J). After the completion of the association, the wireless communication with the peripheral equipment 200 is made (Step S110K).

The following will described a sequence when the association has been completed. Description of steps the same as those already described will be omitted.

The already associated digital camera 100 and the already associated peripheral equipment (PC) 200 are present in the wirelessly connectable wireless connection range 201 shown in FIG. 6. The peripheral equipment ID of the peripheral equipment 200 has been registered in the equipment information storage unit 116 of the digital camera 100.

In this case, since the peripheral equipment ID retrieved in Step S102 has been associated, YES is selected in Step S103. The CPU 107 determines whether the associated image 117B of the peripheral equipment 200 has been recorded in the ASSOCIATION folder in the built-in memory 117 (Step S112). If the associated image 117B has been stored therein, the CPU 107 displays the associated images 117B on the display 102 thorough the display processing unit 114 (Step S113). Conversely, if the associated images have not been recorded, the CPU displays the Friendly Name (Step S114).

As mentioned above, the retrieval is implemented until time-out occurs (Step S106). However, selecting the displayed and associated image or the Friendly Name by the user (Step S105), the retrieval of the peripheral equipment may be interrupted and the connection with the peripheral equipment may be started. Thereby, the connection may be started without waiting for the time-out. This operation has not been defined clearly; however, the digital camera 100 achieves this operation by pressing the arbitrarily assigned button (e.g., OK key 106).

If the associated images 117B have been registered upon association, the list display in Step S107 after the time-out is shown in FIG. 8D. Thus, the user can easily identify that the equipment is the peripheral equipment that has been connected previously.

After selecting the equipment in Step S108 or S105, since the sets of the equipment have been already associated, the CPU 107 proceeds to YES in Step S109, and the sequence moves to Step S111 to make wireless communication with the peripheral equipment 200.

The following will describe the case in which the digital camera 100 has been entered in a plurality of wireless connection ranges. Description of steps the same as those already described will be omitted.

Figure 10:
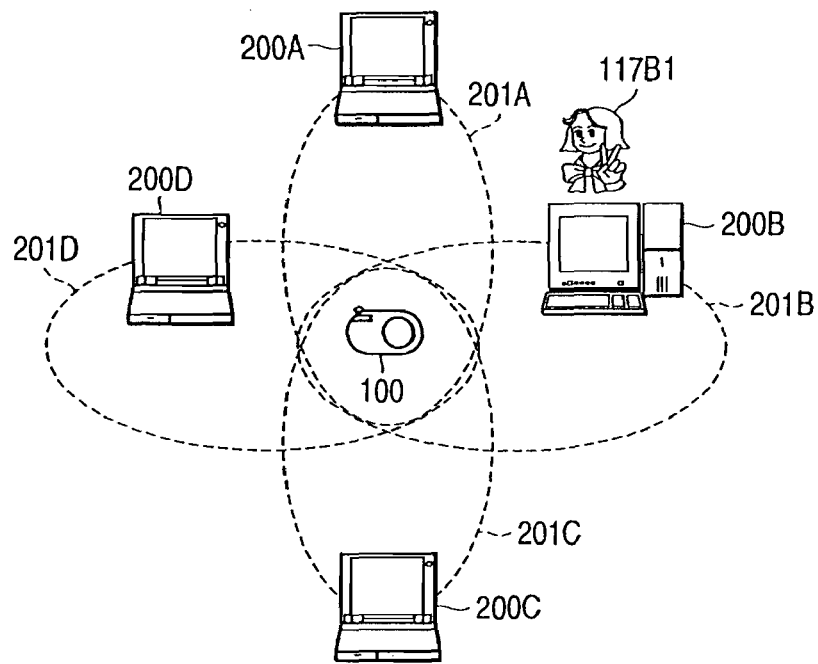
FIG. 10 is an exemplary view depicting a wireless connection range of each set of peripheral equipment when there are a plurality of sets of peripheral equipment for the digital camera.

The case is one in which the digital camera 100 is present in overlapped wireless connection ranges 201A-201D of sets of peripheral equipment 200A-200D as shown in FIG. 10. It is assumed that the peripheral equipment 200A having the wireless connection range 201A is unassociated equipment. Meanwhile, it is assumed that the peripheral equipment 200B having the wireless connection range 201B has been associated, and the associated image 117B1 is associated with the equipment 200B. It is assumed that the peripheral equipment 200C having the wireless connection range 201C and the peripheral equipment 200D having the wireless connection range 201D have been associated, but associated images have not bee assigned thereto.

Figure 11:
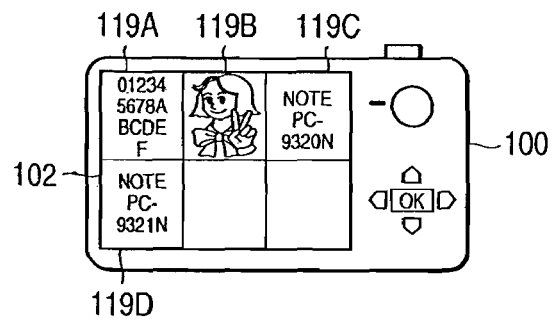
FIG. 11 is an exemplary view depicting an example which displays a list of a plurality of detected sets of peripheral equipment on a screen.

In such a case, the list display displayed in Step S107 becomes a display in which reduced image 119A-reduced image 119D have been displayed in order of detection of the peripheral equipment IDs, as shown in FIG. 11. Here, the reduced image 119A is a reduced image of the peripheral equipment ID of the peripheral equipment 200A. The reduced image 119B is a reduced image of the associated image 117B1 associated with the equipment ID of the peripheral equipment 200B. The reduced image 119C is a reduced image of the Friendly Name stored corresponding to the equipment ID of the peripheral equipment 200C, and the reduced image 119D is a reduced image of the Friendly Name stored corresponding to the equipment ID of the peripheral equipment 200D.

The display in step S104, S113 or S114 becomes a form in which the reduced images on one screen on the display 102 are added and displayed one by one.

Figure 12:
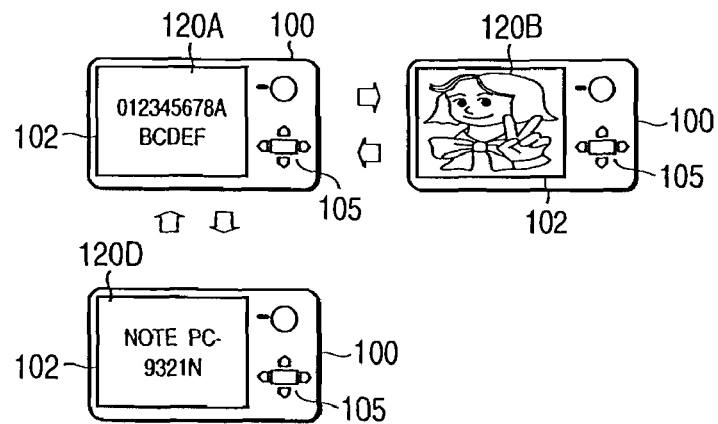
FIG. 12 is an exemplary view depicting an example which switches to display a list of the plurality of detected sets of peripheral equipment.

The list display is not limited to display the reduced images side-by-side on such a screen. For instance, as shown in FIG. 12, one piece of image may be displayed on one screen, and may switch to display a piece of image in response to operations of the up/down and right/left keys 105. That is, at first, the image 120A of the peripheral equipment ID of the peripheral equipment 200A is displayed, and then, the image 120B of the associated image 117B1 associated with the peripheral equipment ID of the peripheral equipment 200B is displayed by through the operation of the right direction key. Here, if the right direction key is operated, although not shown, the image of the Friendly Name stored corresponding to the equipment ID of the peripheral equipment 200C is displayed. Conversely, the operation of the left direction key displays the original image 120A. In a state of display of the image 120A, if the down direction key is operated, the image 120D of the Friendly Name stored in the peripheral equipment ID of the peripheral equipment 200D is displayed.

In this case, the display in the step S104, S113 or S114 become a form in which the images are switched and displayed one by one on one screen of the display 102.

When the digital camera 100 has been associated with the plurality of sets of peripheral equipment and each of the plurality of sets of peripheral equipment have been associated with the associated images, the following will described the sequence.

Figure 13:
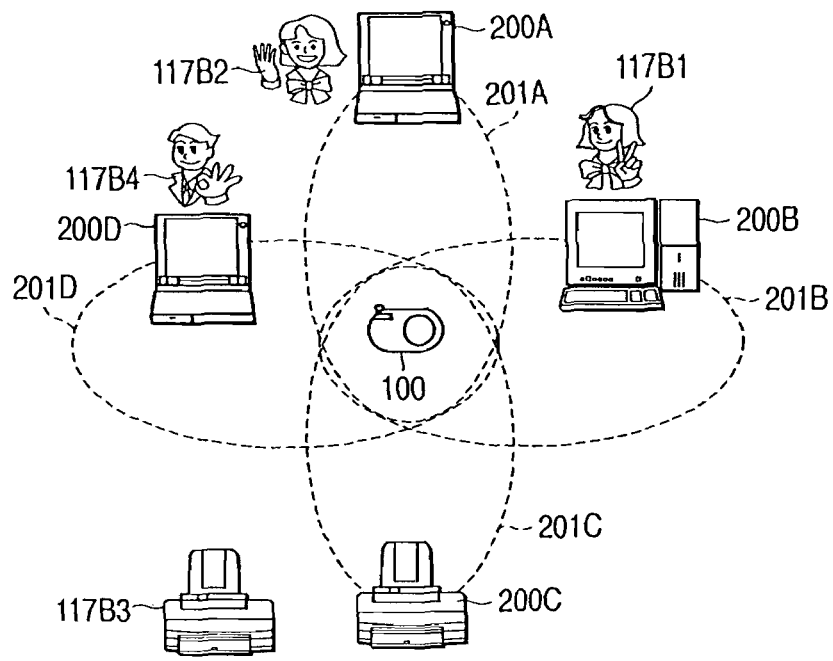
FIG. 13 is an exemplary view depicting a wireless connection range of each set of peripheral equipment when there are a plurality of sets of peripheral equipment which have been already associated with the digital camera.

For instance, as shown in FIG. 13, a case in which the digital camera 100 is present in the wireless connection ranges 201A-201D of the peripheral equipment 200A-200D will be described. It is assumed that the peripheral equipment 200A having the wireless connection range 201A has been associated, and the associated image 117B2 has been assigned. The peripheral equipment 200B having the wireless communication range 201B has been associated, and the associated image 117B1 has been assigned. The peripheral equipment 200C having the wireless communication range 201C has been associated, and the associated image 117B3 has been assigned. The peripheral equipment 200D having the wireless communication range 201D has been associated, and the associated image 117B4 has been assigned.

Figure 14:
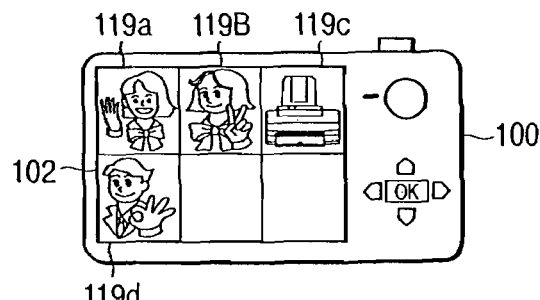
FIG. 14 is an exemplary view depicting an example which displays a list of associated images of the plurality of detected peripheral equipment.

In such a case, the list display displayed in the Step S107, for example, as shown in FIG. 14, the reduces images 119a, 119B, 119c, 119d are displayed in order by which the peripheral equipment IDs have been detected. Here, the reduced image 119a is a reduced image of the associated image 117B2 associated with the peripheral equipment ID of the peripheral equipment 200A. The reduced image 119B is a reduced image of the associated image 117B1 associated with the peripheral equipment ID of the peripheral equipment 200B. The reduced image 119c is a reduced image of the associated image 117B3 associated with the peripheral equipment ID of the peripheral equipment 200C. The reduced image 119d is a reduced image of the associated image 117B4 associated with the peripheral equipment ID of the peripheral equipment 200D.

Figure 15:
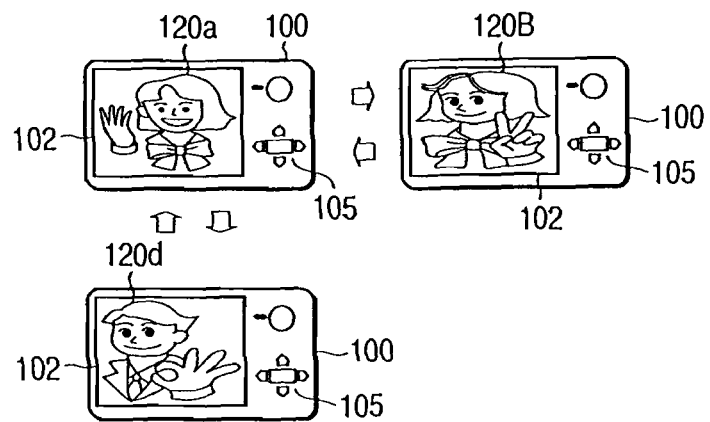
FIG. 15 is an exemplary view depicting an example which switches to display a list of associated images of the plurality of detected sets of peripheral equipment.

FIG. 15 shows a view depicting an example of switching display by means of the up/down and right- and left keys 105 for each associated image. That is, the display 102 displays the image 120a of the associated image 117B12 associated with the peripheral equipment ID of the peripheral equipment 200A, and then, the operation of the right direction key displays the image 120B of the associated image 117B1 associated with the peripheral equipment ID of the peripheral equipment 200B. If the right direction key is operated, although not shown, the image of the associated image 117B3 associated with the peripheral equipment ID of the peripheral equipment 200C is displayed, and conversely, the left direction key is operated, original image 120A is displayed. In a state of display of the image 120A, if the down direction key is operated, the image 120d of the associated image 117B4 associated with the peripheral equipment ID of the peripheral equipment 200D is displayed.

Which of the display methods should be used depends on the program, and the method is not specified herein.

The user may easily identify the peripheral equipment from such a list display and may easily select the peripheral equipment to be wirelessly connected.

Although not shown particularly, when the images are not associated during association, or when the associated images are not varied, the ASSOCIATION folder in the built-in memory 117 may newly register or overwrite the image file to which the peripheral equipment ID is named as the file name. This is because the built-in memory 117 has a normal folder structure, and the built-in memory 117 is operated only by the operation from the digital camera 100 but the built-in memory 117 is recognized as a storage device from the wirelessly connected peripheral equipment (PC), so that the built-in memory 117 is operated through the normal file operation.

As mentioned above, according to the embodiment, the digital camera 100 photographs, for example, the image of the peripheral equipment or the image of the user during association, and stores the image by associating the image with the peripheral equipment ID stored in the equipment information storage unit 116 in the built-in memory 117. Thereby, to connect to the peripheral equipment at the next time, displaying the image associated with the peripheral equipment ID when acquiring the peripheral equipment ID enables identifying and selecting the connection destination by means of the image. Thus, wireless communication equipment and a connection processing method configured to make the user to easily identify the sets of peripheral equipment and to be superior in usability.

To store the peripheral equipment ID in the equipment information storage unit 116 during association, since the digital camera 100 automatically switches to a photographic mode that is an input mode of the associated image, there is no need to perform a specific operation and the camera 100 does not trouble the user. When the CPU 107 calculates numerical values of the association, if the camera 100 switches to the photographic mode before storing the peripheral equipment ID, since the CPU 107 has to perform numerical calculation and operation related to the photographing (e.g., face recognition, camera shake prevention processing) in parallel with each other, the CPU 107 requires power. In this embodiment, since the camera 100 switches to the photographic mode when storing the peripheral equipment ID, namely, since it is configured to enable performing the photographic operation after the numerical calculation, a CPU not having so high ability can be used and the embodiment is advantageous in costs.

It is configured to associate between the peripheral equipment ID and the associated image by naming the file name of the associated image the peripheral equipment ID. Thereby, there is no need to provide a correspondence table among the peripheral equipment ID and the associated image. Further, not securing associated image area in the equipment information storage unit 116 of FIG. 4 enables suppressing a consumed amount of the memory and not increasing the costs.

Further, the camera 100 has a function of enabling selecting the equipment which is desired from the beginning by the user. For instance, not shown particularly, an equipment list display menu is provided in a camera menu, the user selects the equipment form the menu. Then, a list of the already associated equipment is displayed. In this embodiment, such a situation is expressed by FIG. 14 or FIG. 15. The user selects the image by means of the up/down and right/left keys 105 to start the wireless connection through the operation of the OK key 106. In this case, operations of the mode dial 103 shown in FIG. 2 are not necessary.

While the invention has been described in accordance with the embodiment of the above, the invention is not limited to the specific details and representative embodiments shown and described herein, and this invention may be embodied in various forms without departing from the spirit or scope of the general inventive concept thereof.

For instance, the wireless communication equipment is not limited to the digital camera, and the equipment with a camera, and any equipment configured to photograph an associated image can be used.

Further, as regards an image input unit, while the image acquisition unit 112 has been described as an example, any means can be used as long as the image input unit which can read an image to be registered as an associated image from a detachable recording medium, or the image input unit input which can input an image through any method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. Wireless communication equipment which performs association through wireless communication with peripheral equipment present in a prescribed range, comprising:
    a storage unit configured to store identification code information which identifies the peripheral equipment as regards already associated peripheral equipment;
    an acquisition unit configured to acquire identification code information which identifies the associated peripheral equipment from the peripheral equipment present in the prescribed range;
    a determination unit configured to determine whether or not the peripheral equipment has been associated on the basis of identification code information stored in the storage unit;
    an association unit configured to associate the identification code information acquired by the acquisition unit with a prescribed image and to store the identification code information and the prescribed image, when it is determined that the peripheral equipment has not been associated by the determination unit;
    a display unit configured to display the prescribed image information which is associated with the identification code information acquired by the acquisition unit and is stored in the storage unit, when it is determined that the peripheral equipment has been associated by the determination unit;
    a selection unit configured to select image displayed by the display unit; and
    a connection processing unit configured to perform processing which connects the wireless communication equipment to the peripheral equipment corresponding to the identification code information associated with the image selected by the selection unit.

2. The wireless communication equipment according to claim 1, wherein the association unit includes:
    a mode conversion unit configured to switch the wireless communication equipment to an image input mode when storing the identification code information acquired by the acquisition unit in the storage unit; and
    an image input unit configured to input the prescribed image associated with the identification code information to be stored in the storage unit when the wireless communication equipment switches to the image input mode by the mode conversion unit.

3. The wireless communication equipment according to claim 2, wherein
    the mode conversion unit is configured to switch the wireless communication equipment to a photographic mode as the image input mode; and
    the image input unit includes an image acquisition unit configured to photograph the prescribed image to be input so as to associate with the identification code information stored in the storage unit in the photographic mode.

4. The wireless communication equipment according to claim 1, wherein the identification code information is an ID of the peripheral equipment.

5. The wireless communication equipment according to claim 1, wherein the association unit is configured to associate between the identification code information acquired by the acquisition unit with the prescribed image by naming a file name of the prescribed image the ID of the peripheral equipment.

6. A connection processing method of wireless communication equipment which performs association through wireless communication with peripheral equipment present in a prescribed range, comprising:
    acquiring identification code information which specifies the peripheral equipment from the peripheral equipment present in the prescribed range;
    displaying the identification code information when there is no image stored by associating with the acquired identification code information;
    displaying, when there is the image stored by associating with the acquired identification code information, the associated and stored image;
    storing, when the displayed identification code information is selected, the selected identification code information by associating with the prescribed image; and
    connecting, when the displayed image is selected, the wireless communication equipment to the peripheral equipment corresponding to the identification code information associated with the selected image.

* * * * *